United States Patent Office 3,460,575
Patented Aug. 12, 1969

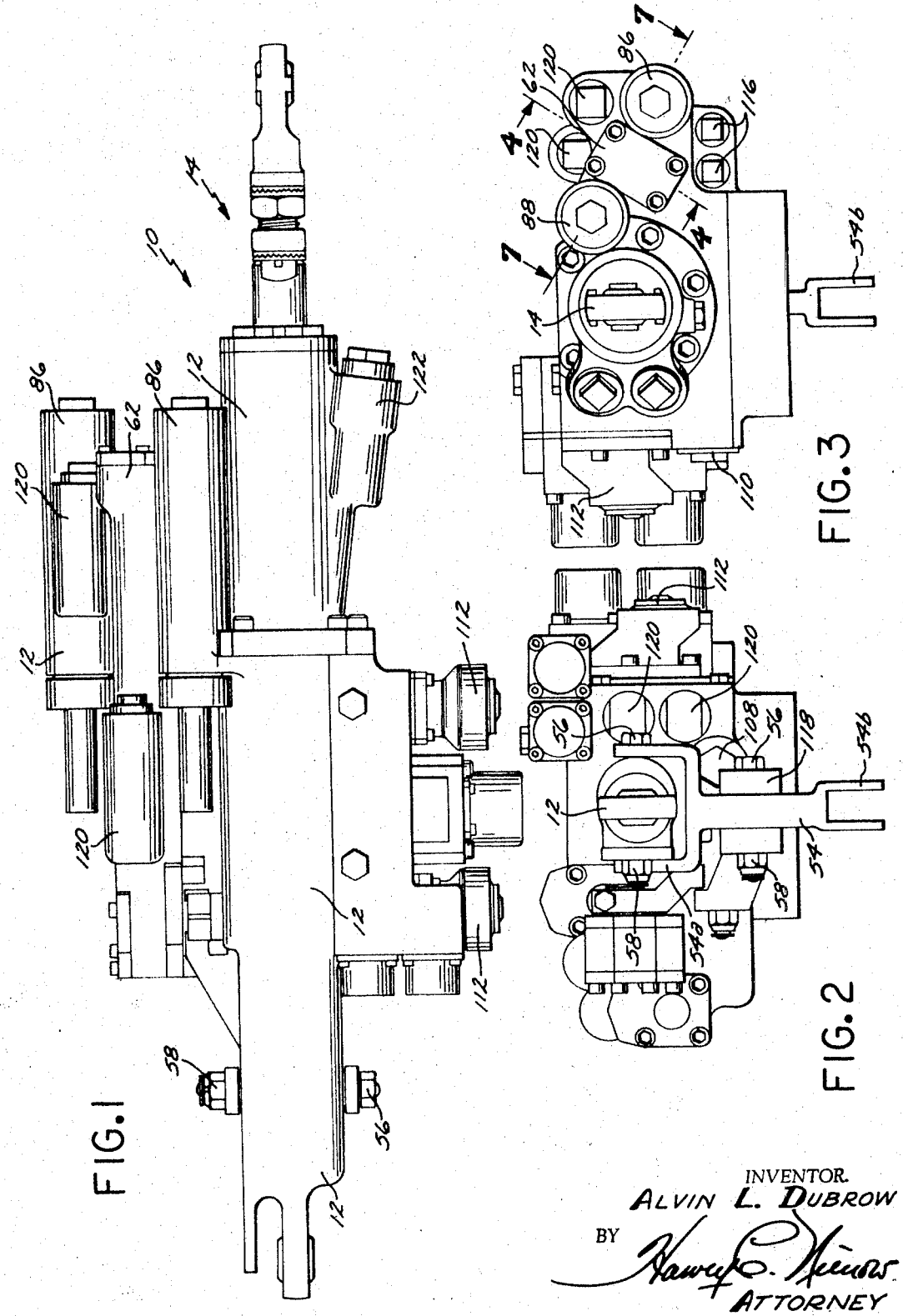

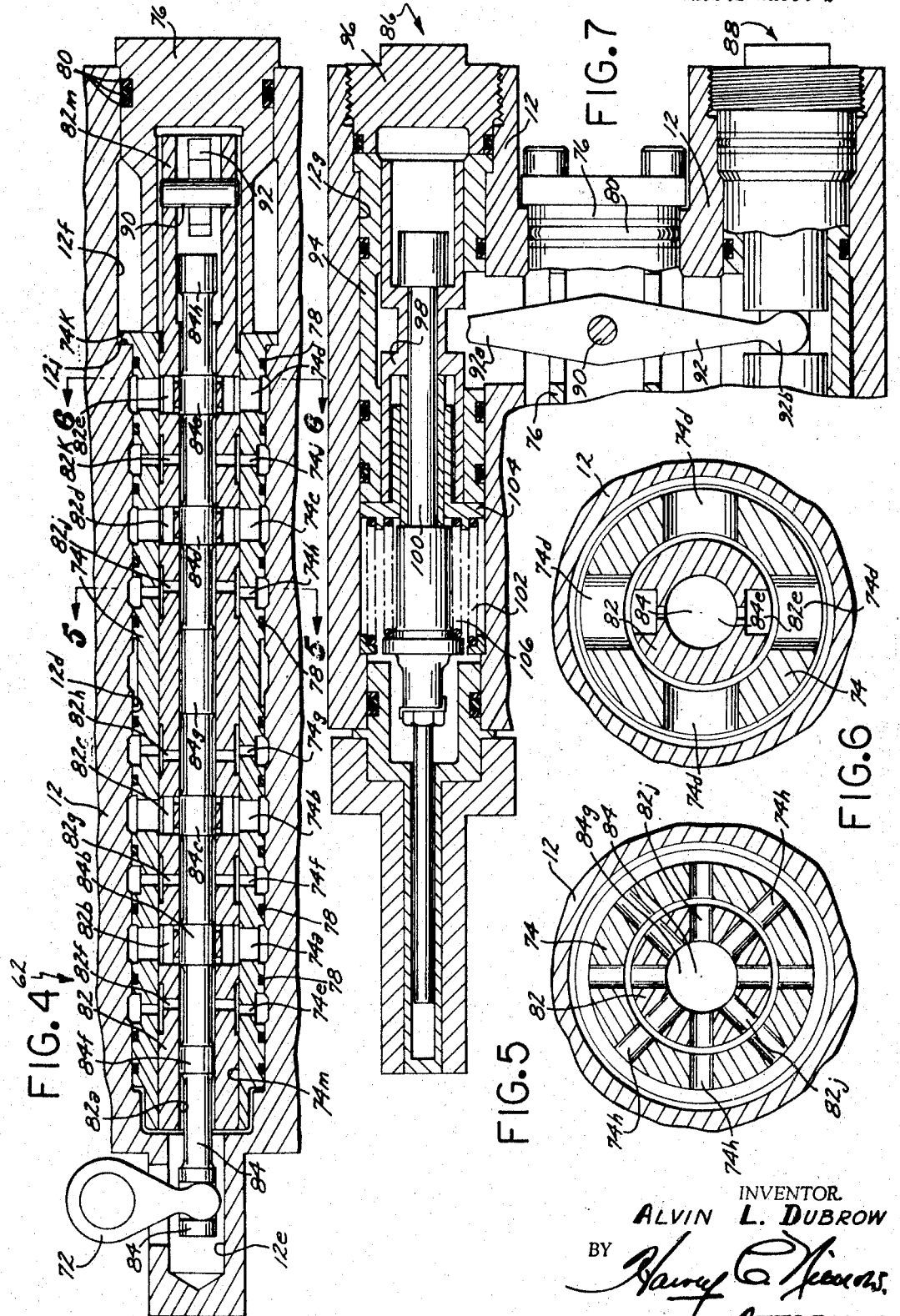

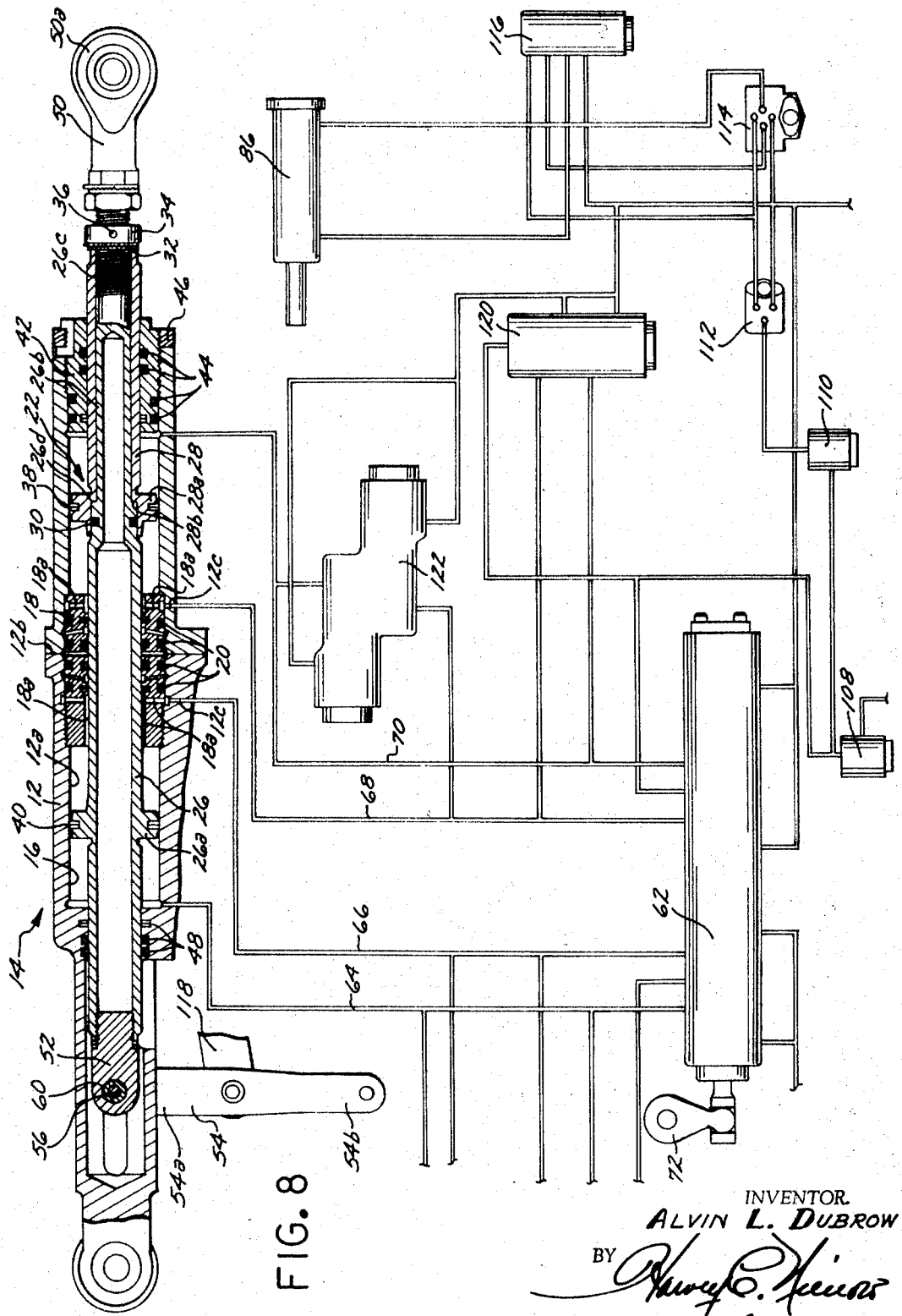

3,460,575
FLUID POWER CONTROL SYSTEM AND COMPONENTS THEREFOR
Alvin L. Dubrow, Corona Del Mar, Calif., assignor to Cadillac Gage Company, Detroit, Mich., a corporation of Michigan
Filed Jan. 23, 1967, Ser. No. 610,843
Int. Cl. F16k *11/00*
U.S. Cl. 137—625.69         6 Claims

ABSTRACT OF THE DISCLOSURE

This invention relates to improvements in hydraulic control systems. The embodiment selected for illustration and description is adapted for use in the manipulation of aircraft control surfaces. It includes a control valve having a housing defining fluid flow paths and a port opening to an elongate bore in which a sleeve is mounted for movement reciprocally along the bore axis. A spool, formed with alternate lands and grooves, is mounted within the sleeve for reciprocal motion along the bore axis. The sleeve is provided with ports which cooperate with the ports of the housing and the lands and grooves of the spool to control the rate of flow of fluid through the valve as a function of the position of the sleeve and spool relative to one another and the housing. Mechanical motion is coupled to the sleeve and to the spool so that spool position and movement is uneffected by sleeve position and movement and so that sleeve position and movement is uneffected by spool position and movement. Two levers are provided, one at each end of the valve, and both levers are mounted for movement on three axes. Input movement structures are connected to two axes of each lever and the third axis of each lever is connected to an associated one of the sleeve and spool. The remaining elements of the aircraft control system are shown and their relationship to the valves and levers is described.

---

The present invention relates generally to fluid power control systems and components thereof, and more particularly to hydraulic control systems for varying the position of predetermined mechanical elements.

The position or movement of certain types of mechanical elements is most efficiently controlled by electro-hydraulic systems for that purpose. For instance, in controlling the position or movement of an elevator or rudder of modern-day relatively large aircraft, it is desirable, if not mandatory, to employ hydraulic actuating and control means for developing the desired mechanical advantage and precision operation. In controlling the movement of a modern-day aircraft elevator considerable force is required due to the relatively large dimensions of the elevator surface. Also, the fact that each aircraft has many such large surfaces to be controlled simultaneously further demands means for creating relatively large mechanical advantage.

In addition to the foregoing, it is desirable to provide a hydraulic control system which can be made responsive to several different control signals. That is, in view of the use today of extremely large, heavy and complicated aircraft, it is desirable, if not mandatory, from an operating standpoint to have automatic information supplied to the control elements of the aircraft simultaneously with manual manipulation thereof. Such aircraft is so heavy and is designed to fly at such fast speeds, that the manual dexterity and mental agility of the pilot cannot be relied upon exclusively. That is, in spite of the extreme competence of modern-day aircraft pilots, the speeds encountered are so great that little time is allowed for the usual reaction of the pilot to a given set of circumstances. Also, such aircraft is so heavy that obvious limitations exist as to how quickly or abruptly, or how extensive a given maneuver can be executed without causing damage and possible drastic consequences to the aircraft and personnel.

Because of such limitations, it is desirable to have the control system automatically superimpose predetermined appropriate electrical signals upon the manual manipulations of the pilot. Prior systems and instrumentalities for this purpose have been subject to malfunction in several respects. For instance, certain of such prior systems have employed relatively complicated apparatuses for combining the manual and electrical signals as applied to hydraulic actuators, the latter of which have been connected to the control surfaces of the aircraft. Such complicated apparatuses have entailed many pivot pins and other needles components, resulting in multiplication of points of failure and malfunction.

The accumulation of metallic chips and other foreign materials within the various system components has also been of concern. Prior hydraulic systems have been unable to cope with such materials and have malfunctioned as a result thereof. If such systems have not malfunctioned as a result of such foreign material, they have lost an appreciable portion of their efficiency due to the fact that many of the pin connections and other mechanical joints have become "sloppy" and virtually unusable.

It is an object of the present invention to provide a dual control hydraulic system which contains a minimum number of parts so as to provide a system which is considerably more reliable.

A further object of the present invention is to provide hydraulic system and component parts therefor having a minimum number of joints to prevent and minimize the accumulation of "play" in the entire system.

Another object of the present invention is to provide a hydraulic control system as characterized above which comprises a main control valve for accumulating both manual and electrical signals for providing accordingly a composite control force.

A still further object of the present invention is to provide a hydraulic control system as characterized above having a control valve comprising concentric control elements which are independently movable but which simultaneously control the flow of fluid to a hydraulic actuator, the net result being the control of a given mechanical element associated with said actuator in response to the movements of both of said control elements.

It is also an object of the present invention to provide a control valve and hydraulic system incorporating the same, wherein said valve comprises a dual concentric slide and sleeve, said slide being responsive to manual control and the sleeve being responsive to electrical signals.

An even further object of the present invention is to provide a control system having a control valve as characterized above wherein the sleeve of the control valve is actuated by a pair of oppositely disposed hydraulic arms so that movement of the sleeve is responsive to a pair of electrical signals or of a single hydraulic ram.

Another object of the present invention is to provide a control system as characterized above where the dual concentric slide and sleeve are jointly and simultaneously operable to control the flow of fluid to a main actuator, the latter of which is connected to the particular mechanical element to be moved.

Another object of the present invention is to provide a control system as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a side elevational view of a control system according to the present invention;

FIGURE 2 is an elevational view of one end of the system of FIGURE 1;

FIGURE 3 is an elevational view of the opposite end of such control system;

FIGURE 4 is a longitudinal sectional view of the control valve for use in said system, taken substantially along line 4—4 of FIGURE 3;

FIGURE 5 is a transverse sectional view of said control valve, taken substantially along line 5—5 of FIGURE 4;

FIGURE 6 is a transverse sectional view, taken substantially along line 6—6 of FIGURE 4;

FIGURE 7 is a fragmentary sectional view through the tandem servo rams, taken substantially along line 7—7 of FIGURE 3; and FIGURE 8 is a schematic showing of the various components used in the subject hydraulic control system.

Like reference characters indicate corresponding parts throughout the several views of the drawings.

Referring to FIGURE 1 of the drawings, there is shown therein, a control system 10 formed as an integral unit according to the present invention. Such system is schematically shown in FIGURE 8, but in its commercial embodiment is housed in a single casting or housing 12, all of the conduits shown in FIGURE 8 being passageways formed in such housing, as will hereinafter become more apparent.

Extending the length of and located substantially centrally within said housing 12 is a main actuator 14, the details of which are shown most clearly in FIGURE 8 of the drawings. Such actuator 14 comprises a cylindrical chamber 12a formed in housing 12, the latter of which thus partially constitutes a cylinder 16. At this location, the housing 12 is formed in two parts, being split along a parting line 12b so that the hydraulic cylinder 16 and chamber 12a are actually formed in two parts. The housing thereat is firmly fastened together in any appropriate manner to provide the unitary structure shown.

Positioned within cylinder chamber 12a is a partition wall 18 threadedly attached to the housing 12 as shown in FIGURE 8. Such partition wall is formed with suitable fluid ports 18a for permitting flow into and out of several cavities formed in cylinder chamber 12a by such partition wall as will hereinafter become more apparent. These ports are disposed in a annular manner about partition wall 18 and cooperate with suitable passageways 12c formed in housing 12.

Sealing rings 20 are positioned in annual grooves formed in partition wall 18 to effectively hermetically seal the mating surfaces of partition wall 18 and cylinder chamber 12a.

A rectilinearly movable piston assembly 22 is slidably positioned within the chamber 12a. Such piston assembly fits within a cylindrical through opening formed in partition wall 18, and suitable sealing member 24 are positioned within approprate annular retaining grooves in partition wall 18 to divide the chamber 12a into the several cavities.

Piston assembly 22 comprises a first piston member 26 having an annular flange portion 26a, and a second piston member 28 having an annular flange portion 28a. Such piston members are telescopically connected together, by virtue of the piston member 28 sliding over the reduced end portion 26b of piston member 26. Suitable sealing means 30 is positioned within an annular cutout in end portion 26b of piston member 26 effectively seal the mating surfaces of members 26 and 28.

The end 26c of end portion 26b is threaded to receive a washer 32 and lock nut 34. Such nut may be provided with a locking pin 36 to retain the piston members 26 and 28 in predetermined assembled relation. In this regard, it is seen that end portion 26b of piston member 26 is formed with an annular shoulder 26d which abuts against an annular shoulder 28b formed on piston member 28. Thus, as nut 34 is threadedly tightened on threaded end 26c, piston member 28 is urged against piston member 26 as shown in FIGURE 8 of the drawings.

Piston rings 38 are operatively positioned within a suitably formed annular groove in the periphery of annular flange 28a of piston member 28, and piston rings 40 are positioned within a similar groove formed in annular flange 26a of piston member 26. Such piston rings effectively seal the respective piston members to the cylindrical surface of the cylinder chamber 12a.

A plug 42 is positioned in one end of the cylinder chamber, in threaded engagement with the housing 12. Such plug comprises suitable sealing members 44 to provide the necessary seal to make an airtight cylinder chamber. A special locking nut 46 is threadedly positioned on the plug 42 to hold the latter in firm fixed position as shown.

The opposite end of the cylinder chamber is formed with a through opening for receiving the piston member 26, there being suitable sealing members 48 to provide the hermetic seal therebetween.

Threadedly positioned on end 26c of piston member 26 is a connector 50 having a connector portion 50a for connection to the appropriate mechanical element. That is, such connector portion 50a is connected by suitable mechanical links or levers to the rudder or elevator of the aircraft or to any other mechanical element to be moved by the subject control system.

The opposite end of piston member 26 is provided with a connector 52 as shown in FIGURE 8. Manually operable link 54 having a bifurcated upper end portion 54a, as shown most clearly in FIGURE 2 of the drawings, is fastened to connector 52 by means of a bolt 56 and nut 58. A hardened sleeve 60 may be employed between the bolt and connector 52 to minimize wear and "play" between the link 54 and piston member 26.

Continuing to refer to FIGURE 8 of the drawings, there is shown therein a control valve 62 connected to actuator 14 by suitable conduits 64, 66, 68 and 70. In the commercial integrated form of the invention, as shown in FIGURES 1–7, inclusive, such conduits are passageways formed in the housing 12 as will hereinafter become more apparent.

The lower end portion 54b of link 54 is connected to control lever 72 at one end of control valve 62. Link 54, and hence lever 72 are manually moved by the pilot as will hereinafter become more apparent.

Referring to FIGURE 4 of the drawings, it is seen that the housing or casting 12 is formed with another cylindrical opening 12d of substantially constant diameter throughout its length. One end 12e of such opening is reduced in size while the other end 12f thereof is enlarged slightly.

A stationary tubular member 74 is anchored within the opening 12d of housing 12 by means of an end plug 76. Such tubular member is formed with primary fluid passageways 74a, 74b, 74c and 74d which cooperate with corresponding passageways formed in housing 12 to afford fluid flow therebetween as will hereinafter become more apparent. Additional secondary fluid passageways 74e, 74f, 74g, 74h and 74j are provided for cooperation with the aforementioned primary passageways in controlling fluid flow to and from the actuator 14. Suitable sealing rings 78 are provided along the length of member 74 for hermetically separating the passageways at the mating surface of the stationary tubular member 74 and housing 12.

One end of tubular member 74 is formed with an annular shoulder 74k which abuts against an annular shoulder 12j formed in housing member 12. The plug 76 is firmly secured in housing 12 to provide a sealing force against tubular member 74, and sealing means 80 is provided for effectively sealing the mating surfaces of plug 76 and housing 12.

Stationary tubular member 74 is further formed with a cylindrical through opening 74m. Within such opening there is slidably positioned a sleeve 82. Such sleeve is formed generally tubular in construction comprising an external cylindrical surface having a sliding fit within the opening 74m of tubular member 74. Also, sleeve 82 is formed with a centrally located through opening 82a.

In addition, sleeve 82 is formed with primary control ports 82b, 82c, 82d and 82e, as well as secondary control ports 82f, 82g, 82h, 82j and 82k.

As will be readily apparent to those persons skilled in the art, the various passageways and ports formed in tubular member 74 and sleeve 82 may take substantially any desired form or configuration, in accordance with the desired control function to be afforded for the fluid flow therebetween as will hereinafter become more apparent. That is, sleeve 82 is operable to rectilinearly slide within the central through opening 74m in tubular member 74, the respective ports of sleeve 82 thereby controlling fluid flow to and from the corresponding passageways formed in stationary tubular member 74. Slidably positioned within the central through opening 82a of sleeve 82 is a rod or slide element 84. End 84a of slide 84 is formed with an appropriate configuration for receiving the lower end portion of connector 72. Housing 12, at this location, is formed with an appropriate opening for receiving such connector 72 into the reduced portion 12e of opening 12d.

Further, slide 84 is formed with primary annular control surfaces 84b, 84c, 84d and 84e, as well as secondary annular control surfaces 84f, 84g and 84h. As shown most clearly in FIGURE 4 of the drawings, the primary annular control surfaces 84b, 84c, 84d and 84e are of such length as to effect complete closure of the corresponding primary control ports in sleeve 82, namely ports 82b, 82c, 82d and 82e, respectively.

As will be readily apparent to those persons skilled in the art, the housing or casting 12 of the subject control system is formed with appropriate passageways or openings for communicating with the various above-described passageways in stationary tubular member 74. This is most clearly shown in FIGURE 8 of the drawings wherein conduits are shown connected to the control valve 62.

The sleeve 82 of control valve 62 is operated by one or more servo rams 86 and 88, shown in FIGURE 7 of the drawings. For this purpose, one end of sleeve 82 is bifurcated as at 82m and a pin 90 is extended therebetween in appropriate openings. A double ended lever 92 formed with a central through opening for receiving pin 90 is positioned as shown in FIGURE 7 with the servo rams 86 and 88 on either side thereof. Such rams are substantially identical in construction and operation and cooperate respectively with the end portions 92a and 92b of lever 92 to control accordingly the position of sleeve 82 within stationary tubular member 74.

Referring to FIGURE 7 of the drawings, it is seen that the housing 12 is formed with an appropriate cylindrical opening 12g. A stationary tubular member 94 is positioned therewithin, being held in place by a threaded plug 96. Slidably positioned within such stationary member is a sleeve 98 and piston 100. A compression spring 102 acts against a collar 104, and a compression spring 106 is interposed between said collar and piston 100.

By the application of fluid pressure to opposite sides of such slidable elements, it is seen that the lever 92 is caused to pivot about the opposite servo ram. That is, upon suitable actuation of servo ram 86, the lever or link 92 is pivoted about the end portion 92b thereof, the latter of which is associated with the servo ram 88. Thus, in response to the change in fluid pressure as applied to ram 86, the sleeve 82 of control valve 62 is moved accordingly.

Conversely, in response to change in fluid pressure applied to ram 88, the lever 92 is caused to pivot about its upper end portion 92a as viewed in FIGURE 7. This causes pin 90 to move accordingly to thereby move sleeve 82. Thus, it is seen that the servo rams 86 and 88 control the position of sleeve 82, and hence contribute to the control of the flow of fluid to actuator 14.

Referring to FIGURES 1, 2, 3 and 8 of the drawings, it is seen that additional control devices are provided in the control system to provide additional functions. As indicated in FIGURE 8, the control system is of a dual nature in that each of the actuator 14 and control valve 62 has a pair of substantially identical control portions. Whereas actuator 14 as two piston members 26 and 28, each of which is provided with a separate annular flange or piston for responding to fluid pressure within its separate cylinder chamber cavity, control valve 62 is provided with two pairs of primary control circuits and appropriate secondary circuits therefor. However, FIGURE 8 shows only one side of such dual control system, at least with respect to the additional or auxiliary control devices.

FIGURE 8 shows filters 108 and 110 through which the hydraulic fluid flows in entering the hydraulic circuit. A solenoid valve 112 is employed for permitting the pilot to utilize the electrical control system as desired. The electrical signals are constantly applied to an electrohydraulic transfer valve 114 with the necessary automatic pilot information. However, it is not until the solenoid valve 112 is suitably energized by the pilot that the electrical automatic pilot information is fed to the remaining components for control accordingly of the sleeve 82 of control valve 62. Each such solenoid valve 112 is an on-off valve under control of the pilot of the aircraft whereon the subject control system is installed.

The transfer valve 114 controls the flow of fluid to servo ram 86, the latter of which, in conjunction with servo ram 88, controls the position of sleeve 82 of control valve 62 as above explained. A delay valve 116 is employed in the hydraulic circuit as shown to delay the return of servo ram 86 to its neutral position. However, this valve is not usually mandatory in the system, although it is frequently desirable.

As will be readily apparent to those persons skilled in the art, as the sleeve 82 of control valve 62 is moved, the degree of cooperation between the various hydraulic ports therein and the hydraulic passageways in stationary tubular member 74 is altered so as to change accordingly the flow of fluid from the source to the actuator 14. Such flow of fluid will exist in the pairs of conduits 64, 66 and 68, 70 to alter the pressure on the piston members 26 and 28, respectively. When this occurs, the entire piston assembly 22 is moved accordingly thereby causing the connector 50 on the end thereof to move the particular control surface. That is, as the sleeve 82 of control valve 62 is moved, the particular control surface of the aircraft is moved accordingly.

In like manner, as the pilot of the aircraft manually moves his control element, the lever or link 54 and slide 84 are moved accordingly. Due to the cooperation between the control surfaces of slide 84 and the flow control ports in sleeve 82, the position of the piston assembly 22 of actuator 14 and hence the position of the control surface are changed accordingly.

It is thus seen that the flow of fluid to actuator 14 is a composite of the control positions of sleeve 82 and slide 84. Due to this arrangement, the electrical automatic pilot signal and the manual action of the pilot are integrated and the resultant is supplied to the actuator 14 and control surface being operated.

A feedback loop is provided in the actuator 14 by means including lever 118. Such feedback loop is connected to link 54 to reposition the slide 84 in accordance with the degree of movement of the piston assembly 22 of the actuator 14. Such coordinated movement further controls the flow of fluid to actuator 14 to cause the piston assembly 22 therein to assume a steady state condition at its new control position. Thus, as the aircraft elevator or other control instrumentality or surface is moved in accordance with the automatic and manual pilot indications, a return signal is provided to the control valve 62 to return the hydraulic fluid flow to the actuator to its original steady state condition. This, of course, results in the elevator or other control surface being maintained in its new position.

A bypass valve 120 is provided in the hydraulic circuit to enable the pilot to render one side of the hydraulic system inoperative if a malfunction should result therein. Such bypass valve merely provides a "run around" circuit in the hydraulic system so that fluid merely passes back and forth rather than being applied to the actuator 14.

A differential pressure limiter 122 is also provided in the hydraulic circuit to provide a bypass circuit from one cylinder of actuator 14 to the other so as to limit the pressure or force applied to the control surface. This permits greater flexibility in changing the design of the system as applied to a given instrument or control surface, and also provides a safety factor in that excessive external forces cannot work against the control instruments when in a fixed position. That is, the application of external wind force and the like to a control surface or elevator of an aircraft when in standby condition, is not applied to a rigid fixed system. Rather, the bypass circuit provided by the pressure limiter absorbs much of such external force thereby preventing damage to the control system.

The subject control valve 62 is of such construction that either the sleeve 82 or slide 84 can be operated separate and independently of each other. This is particularly desirable in the event that a metallic chip or other foreign material becomes lodged between the sleeve and the stationary tubular member 74. Firstly, when this occurs, a relatively large force can be applied to sleeve 82 to attempt to clear the chip or other foreign material. There is sufficient travel in such sleeve to provide such chip clearing operation without any of the movable elements hitting stop members or abutments.

The same function or operation is possible with slide 84. That is, chips or foreign material can be readily cleared due to the construction as above described. In the event the sleeve 82 becomes "frozen" within the stationary tubular member 74, it is possible to continue to operate the aircraft merely with the manual pilot control through slide 84. Under these conditions, the sleeve 82 would be stationary and all of the control of hydraulic fluid flow to actuator 14 would be by manual manipulation of slide 84.

In addition to the foregoing advantages, it is seen that the subject arrangement wherein the slide and sleeve are concentrically arranged within a given housing, minimizes the number of pin connections between the various parts. This minimizes, accordingly, the amount of "play" which develops between the parts, thereby insuring better, more accurate performance of the subject system.

It is thus seen that the present invention provides a new, more efficient hydraulic system for controlling the mechanical movement and position of substantially any type of element to be controlled. Also, such system is particularly characterized by having a control valve or element having a concentric slide and sleeve for accomplishing many advantageous results.

I claim:

1. A fluid power control system for responding to control movements to vary the flow of fluid to fluid responsive instrumentalities comprising in combination: a control valve including a relatively stationary housing formed with at least one fluid passageway, a first control member movably positioned adjacent said housing member and formed with at least one control port for flow control cooperation with said fluid passageway, and a second control member movably positioned adjacent said first member formed with at least one control surface for flow control cooperation with the port of said first member; and means for rendering the flow of fluid through said fluid passageway in said housing member responsive to the composite of the control movements applied to both of said first and second control members including first control means for moving said first member independently of the position and of movement of said second member, and second control means for moving said second member independently of the position and of movement of said first member.

2. A control unit according to claim 1, wherein said first and second control members are generally cylindrical and are co-axially arranged with said second control member mounted for movement within said first control member and both of said first control member and said second control member mounted for movement within said housing.

3. The invention defined in claim 2, in which said first and second control means comprises first and second levers associated with said first and second members respectively, each of said first and second levers being mounted for pivotal movement about three pivotal axes extending therethrough respectively, said first lever having pivotal connection at one of the three axes associated therewith to said first member and said second lever having pivotal connection at one of the three axes associated therewith to said second member; and said invention further comprising means in the form of structures connected to said first lever at the other two pivot points thereof and to said lever at the other two pivot points thereof, respectively for moving of each of said first and second members as a function of the composite of two of four forces applied to said levers at respectively associated ones of said pivotal axes.

4. The invention defined in claim 1, wherein said first control member is provided with connection means at one end thereof for connection to said one control means, and said second control member is provided with connection means at the end thereof adjacent the other end of said first control member for connection to said second control means.

5. The invention defined in claim 1, in which said means for rendering the flow of fluid through said fluid passageway in said housing member responsive to the composite of the control movements applied to both of said first and second control members comprises: means for moving one of said first and second control members relative to said housing in a degree proportional to the difference between two signals, one an input position signal and the other a signal representing the position of said fluid responsive instrumentality; and means for moving the other of said first and second members relative to said housing as a function of the magnitude of said input position signal applied to said one of said first and second control members.

6. The invention defined in claim 1, in which said means for rendering the flow of fluid through said fluid passageway in said housing member responsive to the composite of the control movements applied to both of said first and second control members comprises means for moving one of said first and second control members relative to said housing in a degree proportional to the difference between two signals one an input position signal and the other a signal representing the position of said fluid responsive instrumentality, and means for moving the other of said first and second members relative to said housing as a function of the sum of two signals one of which is variable as a function of one of the signals applied to said one of said first and second control members.

References Cited

UNITED STATES PATENTS

| | | | |
|---|---|---|---|
| 2,631,571 | 3/1953 | Parker | 137—625.68 |
| 2,771,907 | 11/1956 | Joy | 137—625.48 XR |
| 3,152,610 | 10/1964 | McAfee | 137—625.69 XR |
| 3,253,613 | 5/1966 | Richolt | 137—625.69 XR |

HENRY T. KLINKSIEK, Primary Examiner